United States Patent
Lin et al.

(10) Patent No.: US 11,610,741 B2
(45) Date of Patent: Mar. 21, 2023

(54) STACKED SOLID ELECTROLYTIC CAPACITOR, INTEGRATED CIRCUIT PRODUCT AND ELECTRONIC PRODUCT

(71) Applicant: APAQ TECHNOLOGY CO., LTD., Miaoli County (TW)

(72) Inventors: Chieh Lin, Miaoli County (TW); Shang-Che Lan, Miaoli County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 17/453,339

(22) Filed: Nov. 2, 2021

(65) Prior Publication Data
US 2022/0139637 A1 May 5, 2022

(30) Foreign Application Priority Data
Nov. 3, 2020 (TW) .................................. 109138317

(51) Int. Cl.
*H01G 9/26* (2006.01)
*H01G 9/15* (2006.01)
*H01G 9/14* (2006.01)
*H01G 9/012* (2006.01)

(52) U.S. Cl.
CPC .............. *H01G 9/26* (2013.01); *H01G 9/012* (2013.01); *H01G 9/14* (2013.01); *H01G 9/15* (2013.01)

(58) Field of Classification Search
CPC ..................................................... H01G 9/012
See application file for complete search history.

(56) References Cited

U.S. PATENT DOCUMENTS

| 6,362,950 | B1* | 3/2002 | Kamigawa | ........... | H01G 9/0029 |
| | | | | | 361/523 |
| 6,661,645 | B1* | 12/2003 | Sakai | ..................... | H01G 9/042 |
| | | | | | 29/25.03 |
| 2002/0001169 | A1* | 1/2002 | Shiraishi | .................. | H01G 9/26 |
| | | | | | 361/523 |
| 2004/0027789 | A1* | 2/2004 | Kochi | ..................... | H01G 9/15 |
| | | | | | 361/523 |
| 2006/0262486 | A1* | 11/2006 | Tadanobu | ................ | H01G 9/14 |
| | | | | | 361/523 |
| 2010/0149729 | A1* | 6/2010 | Nishioka | .............. | H01G 9/0425 |
| | | | | | 29/25.03 |

FOREIGN PATENT DOCUMENTS

WO WO-9965044 A1 * 12/1999 ............... H01G 9/15

* cited by examiner

*Primary Examiner* — Eric W Thomas
(74) *Attorney, Agent, or Firm* — CKC & Partners Co., LLC

(57) ABSTRACT

A stacked solid electrolytic capacitor is provided in the present disclosure. The stacked solid electrolytic capacitor includes a capacitive module, a conductive module and a packaging structure. The capacitive module includes capacitive units stacked up sequentially. The conductive module includes a positive terminal, a negative terminal and at least one anti-oxidizing layer. The positive terminal is electrically connected to one of the capacitive units. The negative terminal is electrically connected to the one of the capacitive units through a conductive paste layer. The at least one anti-oxidizing layer is arranged between the negative terminal and the conductive paste layer. The packaging structure surrounds the capacitive module and the conductive module. Therefore, it is difficult for an oxide layer forming between the negative terminal and the capacitive units, and the equivalent series resistance of the stacked solid electrolytic capacitor can be reduced.

7 Claims, 2 Drawing Sheets

STACKED SOLID ELECTROLYTIC CAPACITOR, INTEGRATED CIRCUIT PRODUCT AND ELECTRONIC PRODUCT

RELATED APPLICATIONS

This application claims priority to Taiwan Application Serial Number 109138317, filed Nov. 3, 2020, which is herein incorporated by reference.

BACKGROUND

Technical Field

The present disclosure relates to a solid electrolytic capacitor. More particularly, the present disclosure relates to a stacked solid electrolytic capacitor which is able to reduce the equivalent series resistance.

Description of Related Art

Capacitor is one of the common passive electronic components in a circuit, and the functions of energy storage, decoupling, filtering or bypass can be achieved by the capacitor. In order to cope with the coming-up electronic products with lightweight and versatility, the capacitor gets continuous improvements on high capacity, high stability, low impedance and miniaturization. Therefore, capacitors of various materials, such as ceramics, aluminum, tantalum or niobium, or structures, such as wound-type capacitors and stacked-type capacitors, are developed.

The conventional stacked-type solid capacitor includes a capacitive assembly and a conductive assembly. The conductive assembly is made of metals. The capacitive assembly and the conductive assembly are connected by a conductive paste, which ensures that current can pass the capacitive assembly and the conductive assembly successfully. However, the conductive assembly is prone to oxidation under long-term use or in the manufacturing process of high temperature. An oxide layer will form between the capacitive assembly and the conductive assembly, resulting in the increment of the interfacial resistance between the capacitive assembly and the conductive assembly. Thus, the equivalent series resistance of the stacked-type solid capacitor and the energy loss will increase, which is likely to cause the capacitor to heat up and shorten the life thereof.

In this regard, it is still an unsolved problem to reduce the interfacial resistance between the capacitive assembly and the conductive assembly.

SUMMARY

According to the present disclosure, a stacked solid electrolytic capacitor includes a capacitive module, a conductive module and a packaging structure. The capacitive module includes a plurality of capacitive units stacked up sequentially, and each of the plurality of capacitive units includes a positive portion and a negative portion. The positive portions of the plurality of capacitive units are electrically connected to each other, and the positive portions are bent toward a side of the capacitive module. The negative portions of the plurality of capacitive units are electrically connected to each other. The conductive module includes a positive terminal, a negative terminal and at least one anti-oxidizing layer. The positive terminal is electrically connected to the positive portion of one of the plurality of capacitive units from the side of the capacitive module. The negative terminal is electrically connected to the negative portion of the one of the plurality of capacitive units through a conductive paste layer. The at least one anti-oxidizing layer is arranged between the negative terminal and the conductive paste layer. The packaging structure surrounds the capacitive module and the conductive module, and the positive terminal and the negative terminal are partially uncovered by the packaging structure.

According to the present disclosure, an integrated circuit product includes the aforementioned stacked solid electrolytic capacitor.

According to the present disclosure, an electronic product includes the aforementioned stacked solid electrolytic capacitor.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
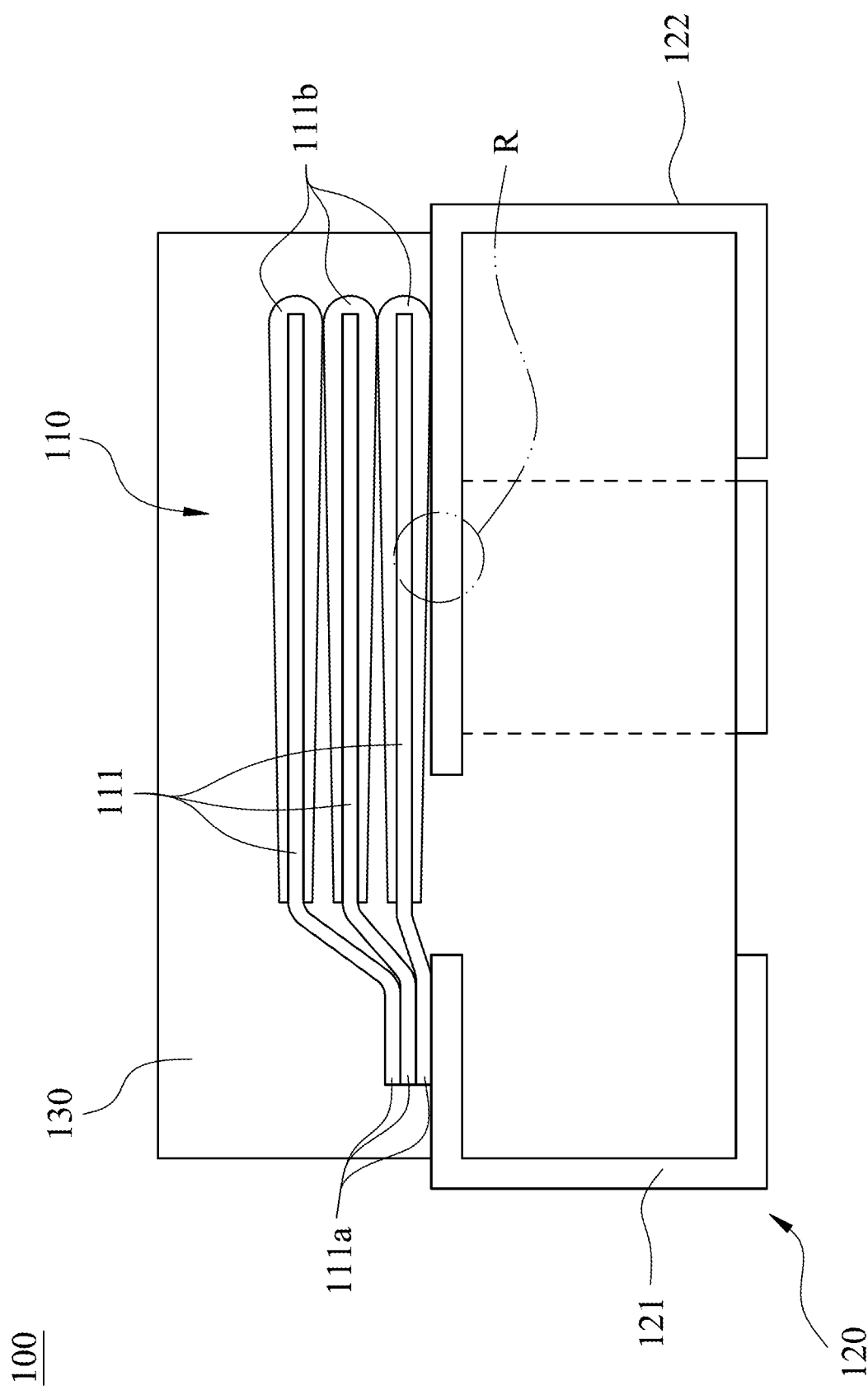
FIG. 1 is a sectional schematic view of a stacked solid electrolytic capacitor according to an embodiment of the present disclosure.

The examples of the present disclosure will be described below with reference to the drawings. For clear explanation, many practical details will also be explained in the following description. Furthermore, in order to simplify the drawings, some conventional structures and elements will be illustrated in the drawings by a simple and schematic way.

Please refer to FIG. 1. FIG. 1 is a sectional schematic view of a stacked solid electrolytic capacitor 100 according to an embodiment of the present disclosure. The stacked solid electrolytic capacitor 100 includes a capacitive module 110, a conductive module 120 and a packaging structure 130. The capacitive module 110 and the conductive module 120 are electrically connected. The packaging structure 130 surrounds the capacitive module 110 and the conductive module 120.

The capacitive module 110 includes a plurality of capacitive units 111 stacked up sequentially. Even though three capacitive units 111 are taken for example in FIG. 1, the present disclosure is not limited to the number of the plurality of capacitive units 111. Each of the plurality of capacitive units 111 includes a positive portion 111a and a negative portion 111b. The positive portions 111a are all bent toward a side of the capacitive module 110 and electrically connected to each other. The negative portions 111b are also electrically connected to each other. Therefore, the plurality of capacitive units 111 are electrically connected, and the capacity of the stacked solid electrolytic capacitor 100 can be improved.

Figure 2:
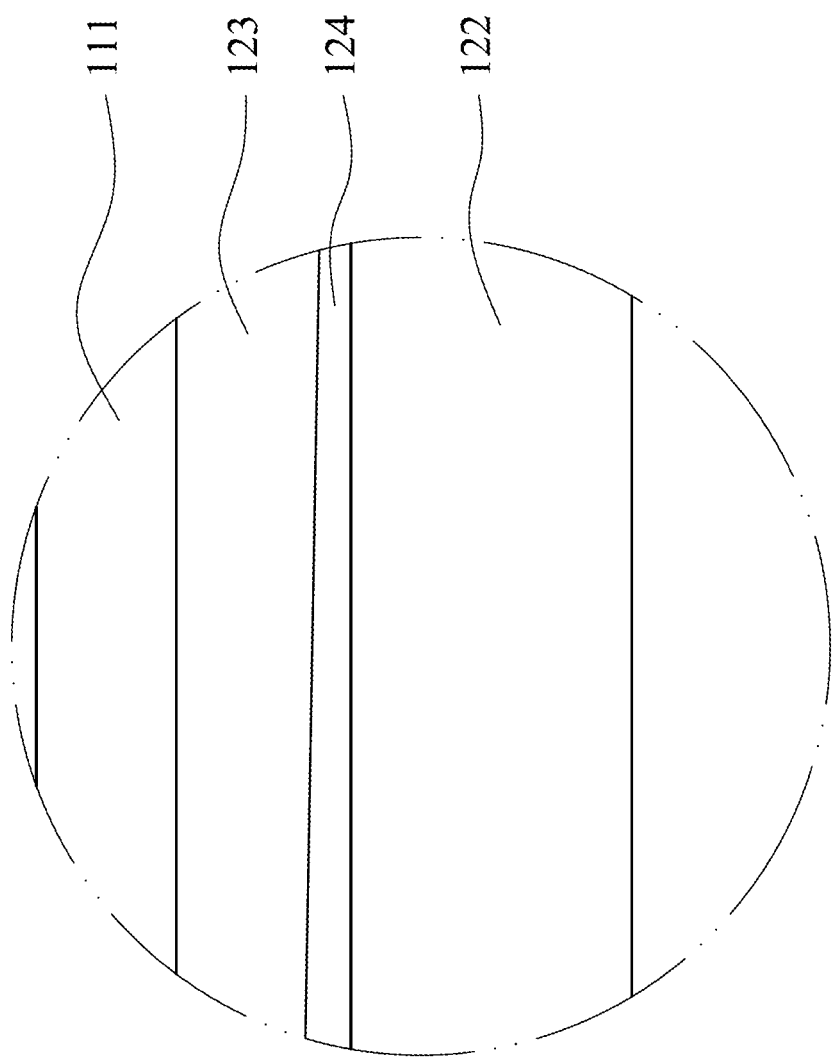
FIG. 2 is a partial enlarged schematic view of the region R in the stacked solid electrolytic capacitor of FIG. 1.

Please refer to FIG. 2. FIG. 2 is a partial enlarged schematic view of the region R in the stacked solid electrolytic capacitor 100 of FIG. 1. The conductive module 120 includes a positive terminal 121 and a negative terminal 122. The positive terminal 121 is electrically connected to the positive portion 111a of one of the plurality of capacitive units 111 from the side of the capacitive module 110. For example, the positive terminal 121 can be connected to the positive portion 111a of the one of the plurality of capacitive units 111 through welding. The negative terminal 122 is electrically connected to the negative portion 111b of the one of the plurality of capacitive units 111 through a conductive paste layer 123. The positive terminal 121 and the negative terminal 122 can be made of copper or copper-zinc alloy. With the aforementioned arrangement, a current can be applied to the capacitive module 110 through the positive terminal 121 and the negative terminal 122.

It is worth noticed that, the conductive module 120 further includes at least one anti-oxidizing layer 124, which is arranged between the negative terminal 122 and the conductive paste layer 123, so as to protect the surface of the negative terminal 122 electrically connected to the one of the plurality of capacitive units 111 and prevent an oxide layer formed on the aforementioned surface. The at least one anti-oxidizing layer 124 can be made of silver, gold, palladium, platinum, graphite, titanium nitride or titanium carbide. When the at least one anti-oxidizing layer 124 is made of palladium, a thickness of the at least one anti-oxidizing layer 124 can be 0.1 nm-900 nm. When the at least one anti-oxidizing layer 124 is made of gold, a thickness of the at least one anti-oxidizing layer 124 can be 0.1 nm-500 nm. An interfacial resistance between the negative terminal 122 and the conductive paste layer 123 of the stacked solid electrolytic capacitor 100, which includes the at least one anti-oxidizing layer 124, can be less than 1 mΩ. Thus, the equivalent series resistance of the stacked solid electrolytic capacitor 100 can be effectively reduced.

It is worth noticed that, the at least one anti-oxidizing layer 124 can include a first anti-oxidizing layer and a second anti-oxidizing layer (which are not shown in the drawings). The first anti-oxidizing layer and the second anti-oxidizing layer are stacked up sequentially along a direction from the negative terminal 122 toward the conductive paste layer 123. The first anti-oxidizing layer can be made of palladium, and the second anti-oxidizing layer can be made of gold. By selecting and properly assembling or arranging the at least one anti-oxidizing layer 124 of different materials, the equivalent series resistance of the stacked solid electrolytic capacitor 100 can be further reduced. The effects of reducing the equivalent series resistance with multiple anti-oxidizing layers 124 will be shown in the following experiments, and the details will not be given herein.

The conductive module 120 can further include a nickel layer (which is not shown in the drawings), and the nickel layer is arranged between the negative terminal 122 and the at least one anti-oxidizing layer 124. For example, the nickel layer can be arranged between the negative terminal 122 and the aforementioned first anti-oxidizing layer. The nickel layer can help the welding and also be a diffusion barrier layer, which prevents metal atoms in the negative terminal 122 diffuse into the dielectric layer. Thus, the service life of the stacked solid electrolytic capacitor 100 can be extended. A thickness of the nickel layer can be 0.1 μm-5 μm, so as to effectively block the metal atoms.

The packaging structure 130 surrounds the capacitive module 110 and the conductive module 120, and the positive terminal 121 and the negative terminal 122 are partially uncovered by the packaging structure 130 for connecting to a circuit. Because the delicate structures such as the capacitive module 110 and the electrical connection between the capacitive module 110 and the conductive module 120 are covered by the packaging structure 130, these delicate structures can be well-protected and the durability of the stacked solid electrolytic capacitor 100 can be improved.

An integrated circuit product or an electronic product is provided in the present disclosure. The integrated circuit product or the electronic product includes the aforementioned stacked solid electrolytic capacitor. It can be understood that, from the foregoing descriptions, the equivalent series resistance of the stacked solid electrolytic capacitor of the present disclosure is smaller. In the integrated circuit product or the electronic product, the stacked solid electrolytic capacitor is suitable as a decoupling capacitor for reducing noise, a filter capacitor for smoothing the current, a snubber capacitor for protecting other electronic components, etc.

Measurements of conductive modules including different arrangements of anti-oxidizing layers are performed as follows, so as to determine whether the equivalent series resistance of the stacked solid electrolytic capacitor can be reduced by arranging the anti-oxidizing layer or not.

1. Different Arrangements of Anti-Oxidizing Layers

In the present experiment, the interfacial resistances of 1st Comparison, 1st Example and 2nd Example are measured to find out whether the interfacial resistance from the negative terminal to the conductive paste layer can be effectively reduced by arranging the anti-oxidizing layer or not.

In 1st Example and 2nd Example, one or two anti-oxidizing layers are arranged between the copper negative terminal and the conductive paste layer (silver paste with a thickness of 100 μm). The average resistance is calculated from the interfacial resistances measured from the negative terminal to the conductive paste layer for several times. A conductive module without anti-oxidizing layer is taken as 1st Comparison in the present experiment, so as to be compared with 1st Example and 2nd Example. The detailed structures and average resistances of 1st Comparison, 1st Example and 2nd Example are listed in Table 1 below.

TABLE 1

Structures and Resistances of 1st Comparison, 1st Example and 2nd Example

| | First Anti-Oxidizing Layer | | Second Anti-Oxidizing Layer | | Average Interfacial |
| --- | --- | --- | --- | --- | --- |
| | Material | Thickness (nm) | Material | Thickness (nm) | Resistance (mΩ) |
| 1st Comparison | | | | | 4.905 |
| 1st Example | Gold | 150 | | | 0.353 |
| 2nd Example | Palladium | 50 | Gold | 150 | 0.365 |

As shown in Table 1, the resistance of 1st Comparison is apparently larger than that of 1st Example and 2nd Example, which include the anti-oxidizing layers. That is because the copper material in the structure without anti-oxidizing layer is prone to oxidation, and insulating copper oxide will form on the surface of the negative terminal, affecting the current passing through. On the contrary, the metal material can be protected from oxidation by the anti-oxidizing layer, and the interfacial resistance between the negative terminal and the conductive paste layer can be significantly reduced.

2. Different Thicknesses of Anti-Oxidizing Layers

In the present experiment, the equivalent series resistances of 2nd Comparison and 3rd Example to 5th Example are measured to find out the effects of reducing the equivalent series resistances with different thicknesses of the anti-oxidizing layers.

The stacked solid electrolytic capacitors of 3rd Example to 5th Example include the copper negative terminal and two anti-oxidizing layers arranged between the negative terminal and the conductive paste layer. The thickness of one of the two anti-oxidizing layers is changed. The stacked solid electrolytic capacitor of 2nd Comparison does not include the anti-oxidizing layer. The capacities of the aforementioned capacitors are all 470 μF. The average equivalent series resistance (average ESR) thereof is calculated from the equivalent series resistances measured under an alternating current of 100 kHz for several times. The detailed structures and average ESR of 2nd Comparison and 3rd Example to 5th Example are listed in Table 2 below.

TABLE 2

Structures and ESR of 2nd Comparison and 3rd Example to 5th Example

| | First Anti-Oxidizing Layer | | Second Anti-Oxidizing Layer | | Average |
|---|---|---|---|---|---|
| | Material | Thickness (nm) | Material | Thickness (nm) | ESR (mΩ) |
| 2nd Comparison | | | | | 4.23 |
| 3rd Example | Palladium | 100 | Gold | 100 | 2.68 |
| 4th Example | | 80 | | 100 | 2.85 |
| 5th Example | | 40 | | 100 | 3.32 |

As shown in Table 2, the equivalent series resistance of 2nd Comparison is apparently larger than that of 3rd Example to 5th Example, which proves that the equivalent series resistance can be effectively reduced by arranging the anti-oxidizing layer. Moreover, when the thickness of the anti-oxidizing layer increases, the skin effect in the negative terminal can be reduced, and the equivalent series resistance of the stacked solid electrolytic capacitor can further decrease.

In this regard, according to the stacked solid electrolytic capacitor of the present disclosure, the oxidation rate of the surface of the negative terminal can significantly decrease by arranging the anti-oxidizing layer. It is difficult for an oxide layer forming between the negative terminal and the capacitive units, and the interfacial resistance between the negative terminal and the capacitive units can effectively decrease. Therefore, the equivalent series resistance of the stacked solid electrolytic capacitor can be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A stacked solid electrolytic capacitor, comprising:
a capacitive module, wherein the capacitive module comprises a plurality of capacitive units stacked up sequentially, and each of the plurality of capacitive units comprises:
a positive portion, wherein the positive portions of the plurality of capacitive units are electrically connected to each other, and the positive portions are bent toward a side of the capacitive module; and
a negative portion, wherein the negative portions of the plurality of capacitive units are electrically connected to each other;
a conductive module, comprising:
a positive terminal, electrically connected to the positive portion of one of the plurality of capacitive units from the side of the capacitive module;
a negative terminal, electrically connected to the negative portion of the one of the plurality of capacitive units through a conductive paste layer; and
at least one anti-oxidizing layer, arranged between the negative terminal and the conductive paste layer; and
a packaging structure, surrounding the capacitive module and the conductive module, wherein the positive terminal and the negative terminal are partially uncovered by the packaging structure;
wherein the at least one anti-oxidizing layer comprises a first anti-oxidizing layer and a second anti-oxidizing layer, the first anti-oxidizing layer and the second anti-oxidizing layer are stacked up sequentially along a direction from the negative terminal toward the conductive paste layer, the first anti-oxidizing layer is made of palladium, and the second anti-oxidizing layer is made of gold; and
wherein a thickness of the first anti-oxidizing layer is 40 nm-100 nm, and a thickness of the second anti-oxidizing layer is 100 nm.

2. The stacked solid electrolytic capacitor of claim 1, wherein the positive terminal and the negative terminal are made of copper or copper-zinc alloy.

3. The stacked solid electrolytic capacitor of claim 1, wherein the conductive module further comprises a nickel layer, and the nickel layer is arranged between the negative terminal and the first anti-oxidizing layer.

4. The stacked solid electrolytic capacitor of claim 3, wherein a thickness of the nickel layer is 0.1 μm-5 μm.

5. The stacked solid electrolytic capacitor of claim 1, wherein an interfacial resistance between the negative terminal and the conductive paste layer is less than 1 mΩ.

6. An integrated circuit product, comprising the stacked solid electrolytic capacitor of claim 1.

7. An electronic product, comprising the stacked solid electrolytic capacitor of claim 1.

* * * * *